United States Patent
Kellerer et al.

(10) Patent No.: US 9,334,740 B2
(45) Date of Patent: May 10, 2016

(54) VIBRATION DAMPER FOR ROTATING PARTS

(75) Inventors: Rudolf Kellerer, Waldshut-Tiengen (DE); Herbert Brandl, Waldshut-Tiengen (DE)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 781 days.

(21) Appl. No.: 13/598,954

(22) Filed: Aug. 30, 2012

(65) Prior Publication Data

US 2013/0058785 A1    Mar. 7, 2013

(30) Foreign Application Priority Data

Sep. 6, 2011    (EP) .................................... 11180137

(51) Int. Cl.
| | | |
|---|---|---|
| *F01D 5/16* | (2006.01) | |
| *F01D 5/18* | (2006.01) | |
| *F16F 15/36* | (2006.01) | |

(52) U.S. Cl.
CPC *F01D 5/16* (2013.01); *F01D 5/181* (2013.01); *F16F 15/363* (2013.01)

(58) Field of Classification Search
CPC ............. F01D 5/10; F01D 5/16; F01D 5/181; F01D 5/26; F01D 25/04; F01D 25/06; F05D 2260/96
See application file for complete search history.

(56) References Cited

U.S. PATENT DOCUMENTS

| | | | | |
|---|---|---|---|---|
| 1,833,751 A | | 11/1931 | Kimball | |
| 2,292,072 A | | 8/1942 | Hanna et al. | |
| 2,349,187 A | * | 5/1944 | Meyer | ........................... 416/190 |
| 2,916,307 A | * | 12/1959 | Peters | ........................... 285/9.2 |
| 3,396,905 A | * | 8/1968 | Johnson | .................. F01D 5/022 415/119 |
| 5,219,144 A | * | 6/1993 | Fox et al. | ....................... 248/562 |
| 5,369,882 A | | 12/1994 | Dietz et al. | |
| 5,820,348 A | | 10/1998 | Fricke | |
| 5,924,845 A | | 7/1999 | Bagley et al. | |
| 6,827,551 B1 | | 12/2004 | Duffy et al. | |

FOREIGN PATENT DOCUMENTS

| | | |
|---|---|---|
| EP | 0467427 A2 | 1/1992 |
| EP | 1878871 A1 | 1/2008 |
| EP | 1892377 A1 | 2/2008 |
| GB | 2090339 A | 7/1982 |
| JP | 02154809 A * | 6/1990 |

\* cited by examiner

*Primary Examiner* — Craig Kim
*Assistant Examiner* — Adam W Brown
(74) *Attorney, Agent, or Firm* — Buchanan Ingersoll & Rooney PC

(57) ABSTRACT

A rotating element for a rotating machine, in particular for a turbine machine, is provided with a vibration damper for vibrations of the rotating element during operation of the machine. The vibration damper includes a closed cavity in the body of the rotating element. In the closed cavity there is located a movable solid damping body as well as a damping medium. The damping medium is based on a metal which is in liquid state at the operation temperature where damping is desired. It furthermore relates to turbo machines equipped with such rotating elements as well as to uses of liquid metal for such vibration dampers.

24 Claims, 2 Drawing Sheets

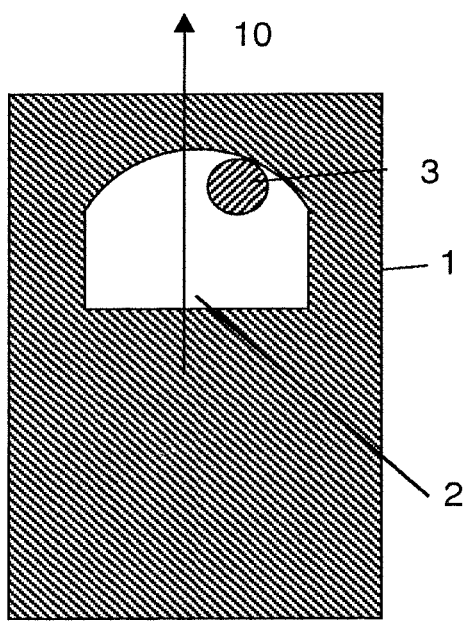
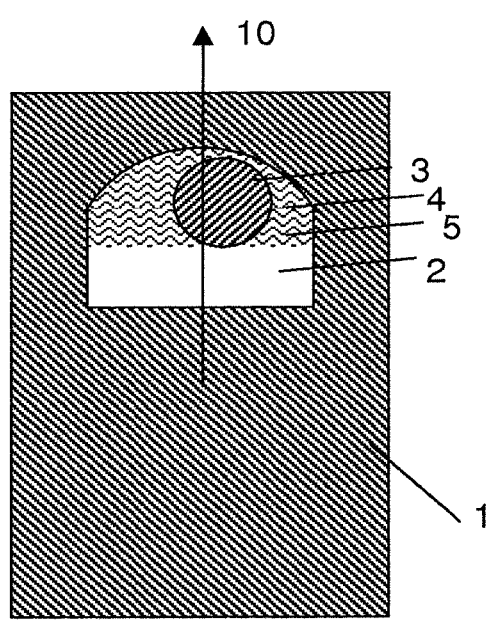
PRIOR ART
FIG. 1
FIG. 2

VIBRATION DAMPER FOR ROTATING PARTS

CROSS REFERENCE TO RELATED APPLICATIONS

The present application hereby claims priority under 35 U.S.C. Section 119 to European Patent application number 11180137.9, filed Sep. 6, 2011, the entire contents of which are hereby incorporated by reference.

FIELD OF THE INVENTION

The present invention relates to a vibration damper for rotating parts of rotating machine, in particular for rotating blades of a compressor or a turbine, in particular of a gas turbine. It furthermore relates to a method for making such a vibration damper equipped rotating part as well as to a gas turbine equipped with such vibration damper systems.

BACKGROUND

In gas turbine applications, blades and vanes face vibratory excitation during operation. This excitation causes stresses in parts. These stresses must be kept below certain limits to avoid premature failure of the part or gas turbine, respectively.

One means to keep stresses below limits is to increase damping by introduction of damping devices. Commonly, interlocking shrouds are used to this end. These shrouds provide besides a damping effect also a frequency-tuning mean. However, in some cases this is not sufficient e.g. for very long airfoils or not possible for shroud-less blades/vanes.

Thus, additional damping devices are used like under platform dampers as disclosed for example in U.S. Pat. No. 5,369,882, pendulum absorbers as disclosed for example in U.S. Pat. No. 5,924,845 or impact dampers as disclosed for example in U.S. Pat. No. 6,827,551, the contents of all of which are incorporated herein by reference as if fully set forth.

U.S. Pat. No. 5,924,845 states, that the pendulum absorber becomes more robust with respect to vibration attenuation and lifetime if it is damped. It is noted that this damping comes from some aerodynamic damping within the hollow blade and due to friction in the attachment of the pendulum. However, these types of damping are limited to a narrow range of damping ratios $\xi_P$.

Impact dampers can also increase the damping and thus reduce the vibratory stresses in parts. Such an arrangement is shown in U.S. Pat. No. 6,827,551 disclosing blades with impact damper arrangements. The added damping $\Delta\xi$ by an impact damper depends, in addition to other parameters, on the viscous damping ratio $\xi_2$ between primary mass (e.g. blade or vane in which the corresponding cavity is located) and the damper mass (damping element, ball).

SUMMARY

The present disclosure is directed to a rotating element for a turbine machine. The rotating element includes a vibration damper for damping vibrations of the element during operation of the machine. The vibration damper includes a closed cavity in a body of the element. In the closed cavity, a movable solid damping body as well as a damping medium are located. The damping medium includes a metal which is in liquid state at an operation temperature where damping is desired.

The present disclosure is also directed to a turbo machine including at one of the above rotating elements. In the turbo machine, the rotating element is a rotating blade of a compressor and/or a turbine thereof and all rotating blades of a row of blades are equipped with the vibration damper.

Further, the disclosure is directed to a use of a liquid metal as a damping medium for a vibration damper for a rotating element of a rotating machine for damping vibrations of the rotating element during operation of the machine. The vibration damper including a closed cavity in the body of the rotating element and in the closed cavity, a movable solid damping body and said liquid metal are located as damping medium. The liquid metal is in liquid state at an operation temperature where damping is desired.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings, FIG. 1 shows a schematic cut through a vibration damper system in accordance with the prior art;

FIG. 2 shows a schematic cut through a vibration damper system in accordance with the present invention;

DESCRIPTION OF PREFERRED EMBODIMENTS

Introduction to the Embodiments

Figure 3:
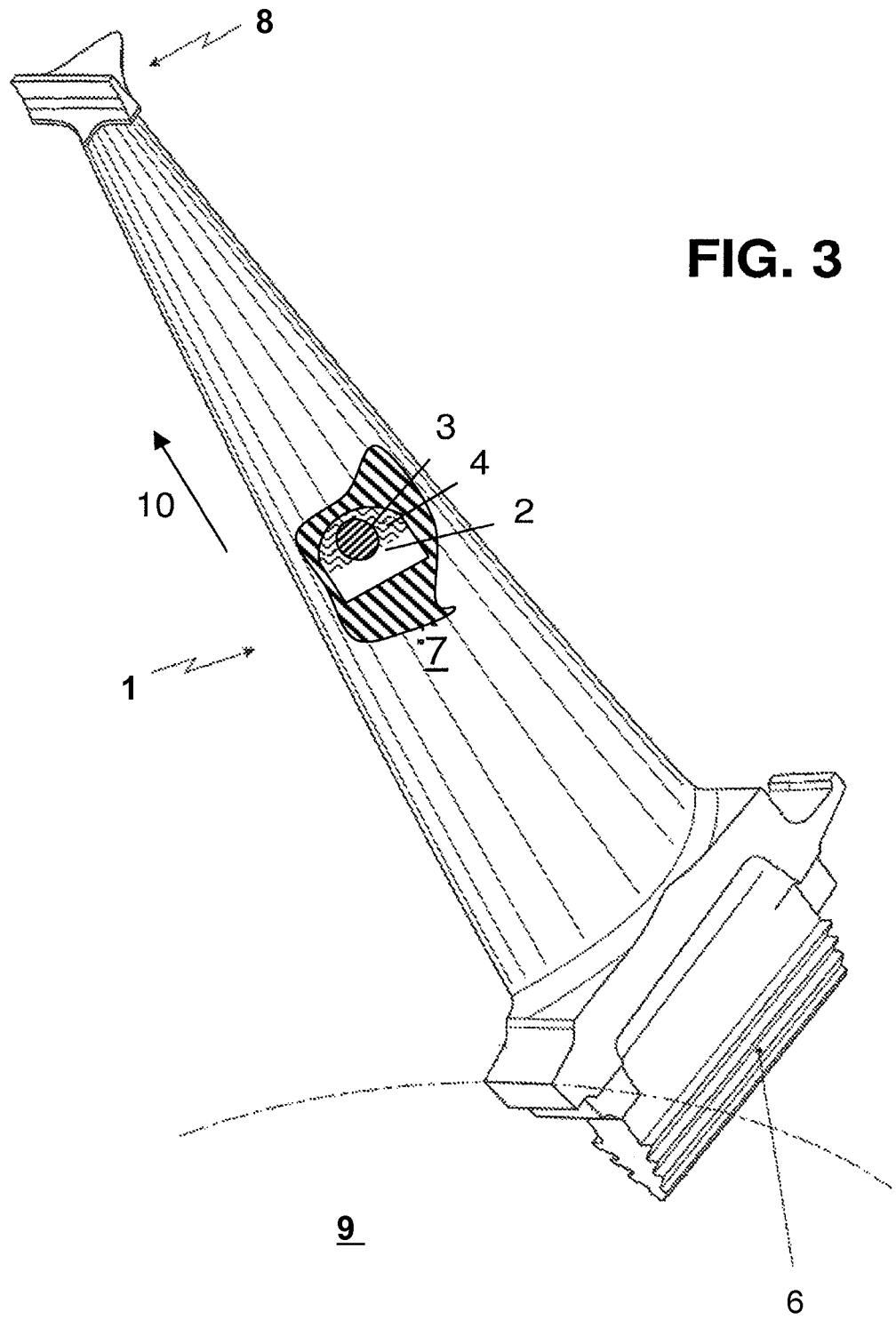
FIG. 3 shows a schematic view of a blade with a vibration damper system in accordance with the present invention.

It is that the object of the present invention to provide an improved vibration damping element for rotating or stationary elements for a rotating machine, in particular rotating elements for a turbine machine, being provided with a vibration damper for vibrations of the element during operation of the machine.

In accordance with the present and proposed invention, the vibration damper arrangement comprises a closed cavity in the body of the (rotating) element, wherein in said closed cavity there is located a movable solid damping body (e.g. a ball or other shaped object or pendulum) as well as a damping medium. This damping body, preferably there is only one damping body per cavity, is preferably sufficiently small so as to substantially move within the cavity, typically its size is not more than one or two orders of magnitude smaller than the size of the cavity. In particular, said damping medium is based on a metal which is in its liquid state at the operation temperature where damping is desired.

The present invention in particular proposes means allowing purposeful adjustments of $\xi_P=\xi_2$. $\xi_P=\xi_2$ depends on the viscosity of the fluid surrounding the impact damper mass. Changing the fluid can influence this viscosity. In low temperature applications, these fluids can be water or oil. In high temperature applications such as hot gas path parts (e.g. blades or vanes) this can be done by liquid metals or alloys. The viscosity of liquid metals is in the order of water (at 20° C.) both being three orders of magnitude higher than air. Addition of particles of high melting metals can further modify the viscosity of liquid metals or alloys. The combination of solid particles and liquid metal is called a metal dispersion. Viscosity values of metal dispersions can be in the range of 0.01-10,000 Pas.

Metals or metal alloys with comparatively low melting points are the basis of the damping medium for this purpose.

During start-up of the engine, the hot gas path parts become hotter. Thus, while at rest in cool state being solids, during start-up the metal, as the damping medium in the damper arrangement, will liquefy.

The melting point of the low melting damping medium, so the metal or metal alloy, is preferably chosen below the operating range where additional damping is required. This is because the damper arrangement can only work after the metal is liquid. Typically the operation temperature of a gas turbine under standard load conditions is in the range of 800-2000° C., preferably in the range of 1100-1500° C. which means that normally the corresponding damping medium should be liquid in that temperature window.

The boiling point of the metal should furthermore be sufficiently above the maximum operation temperature of the part to high pressures in the cavities and to avoid loss of metal. In view of the above temperature ranges for the operation of a gas turbine, preferably the boiling point of the damping medium should be above 1000° C., preferably above 2000° C.

Selecting the right metal, alloy or metal dispersion requires consideration of melting and boiling point and required viscosity during operation. In addition, the metal or metal alloy should be selected such as not to harm the material forming the cavity and/or the material forming the damping body. In order to protect the wall portions of the cavity and/or the material forming the damping body from harm by the damping medium it can be, in accordance with another preferred embodiment, advantageous to protectively coat the walls of the cavity and/or the outside of the damping body.

In order to avoid loss of liquid metal the damper arrangement including the liquid metal should be confined in a closed container at all times. The container can be completely filled with the damping medium, however it is preferably not completely filled with the damping medium, so the liquid metal, to account for thermal expansion.

The dissipated energy by the damping will heat up the damping arrangement. The liquid metal has the beneficial effect that due to its high thermal conductivity (compared to air) the heat is transferred more efficiently to the container walls and from there to the damped primary part. From the parts surface it will be taken away either by convection due to the hot gas or by the internal cooling scheme of the part in case it is a cooled part.

According to a preferred embodiment of the invention, the metal of the damping medium has a melting point in the range of 150-800° C., preferably in the range of 200-500° C.

The metal of the damping medium preferably has a boiling point above 800° C., preferably above 1000° C., particularly preferably above 2000° C. In case metal alloys are used as damping medium, the above-mentioned values for melting point and/or boiling point are often, as well known to the skilled person, not specific values but are given as melting ranges and/or boiling ranges.

The metal of the damping medium is preferably based on at least one metal selected from the group of: aluminum, magnesium, zinc, tin, lead, copper, silver, manganese or alloys thereof or alloys of one or several members of this group as principal constituents in an amount of more than 50 weight percent, preferably in an amount of more than 80 weight percent with another metal.

According to yet another preferred embodiment, the damping medium is a dispersion of solid particles in a metal which is in liquid state at the operation temperature where damping is desired, wherein preferably the solid particles have a melting point above 800° C., preferably above 1000° C., particularly preferably above 2000° C. Solid particles in the sense of this preferred embodiment means that preferably the particles remain solid particles over the whole operation temperature range of the desired uses. Typically therefore the solid particles are inorganic particles, preferably particles based on elementary metal or metal alloy or based on metal oxides. Also possible are glasses or other high temperature resistant particles.

Preferably, the particles being dispersed in this liquid metal dispersion have an average size which is again at least one, preferably at least two or even three orders of magnitude smaller than the size of the damping element. Preferentially the particles being dispersed in this liquid metal dispersion have an average size of less than 1 mm, preferably of less than 500 µm, more preferably of less than 200 µm, most preferably of less than 100 µm.

The use of a liquid metal dispersion has the advantage of permitting adjustment of the viscosity of the damping medium by means of adjustment of the concentration and/or the particle size and/or the particle shape and/or the particle composition (also a mixture of different particles, differing in size and/or shape and/or chemical constitution is possible) and not only allow for adjustment of the viscosity by choosing the corresponding metal or metal alloy. In other words, these further parameters can be used in an essentially continuous range for adjusting the damping characteristics of the vibration damper.

According to yet another preferred embodiment, the movable solid damping body is a ball, and preferably the shape of the cavity is chosen such that damping takes place at least partly by impact damping on the walls of the cavity. Preferably the cavity to this end has a concave wall providing the radial outer boundary, and/or essentially straight walls delimiting in both circumferential directions.

The rotating element is, according to a preferred embodiment, a rotating blade of a compressor or a turbine or a shroud thereof.

According to yet another preferred embodiment, the vibration damper is located with respect to the rotation axis at the outer end portion of the rotating element.

Furthermore, the present invention relates to a turbo machine with at least one stationary and/or rotating element as outlined above, wherein preferably the rotating element is a rotating blade of a compressor and/or a turbine thereof and wherein, most preferably, all the rotating blades of a row of blades are equipped with a vibration damper.

Additionally, the present invention relates to the use of a liquid metal as a damping medium for a vibration damper for a rotating element of a rotating machine for the damping of vibrations of the rotating element during operation of the machine, the vibration damper comprising a closed cavity in the body of the rotating element, wherein in said closed cavity there is located a movable solid damping body as well said liquid metal as damping medium, wherein said liquid metal is in its liquid state at the operation temperature where damping is desired. Further preferred possibilities of selecting the damping medium are as outlined above.

The liquid metal for this use can be a dispersion of solid particles in a metal which is in liquid state at the operation temperature where damping is desired, wherein preferably the solid particles have a melting point above 800° C., preferably above 1000° C., particularly preferably above 2000° C. Further preferred possibilities of selecting the dispersion of solid particles in a metal are as outlined above.

DETAILED DESCRIPTION

FIG. 1 shows a schematic cut through a rotating part 1 of a rotating machine, so for example through a blade of a turbine or through a shroud, in particular the outer shroud of such a blade. On the bottom side of the displayed cut the rotation axis is located (assumed to be perpendicular to the page's plane), and the top side of the displayed cut is the radial outer portion of the rotating part.

The rotating part 1 comprises a cavity 2 which is filled with air and with a damping body, in this case with a round ball 3. In other words the radial outer wall of the cavity with respect to the rotation has a concave shape, either in the sense of a cylindrical wall (one-dimensionally concave) or in the sense of the surface of a spherical cap (two-dimensionally concave); this can be chosen depending on need. The radial inner wall of the cavity is a straight wall can however also be a concave or convex wall, and the lateral walls are also both straight walls confining the cavity.

During operation, the damping effect will on the one hand be provided by the collisions of the ball 3 at the two lateral wall portions of the cavity 2. In addition, damping in certain frequency ranges will be provided by the fact that the ball moves in a phase shifted manner on the concave top wall on the radial outer side. In operation the ball 3 is kept at the top of the cavity 2 by centrifugal force 10.

The damping characteristics of this mechanism according to the prior art can be adjusted by adjusting the size and mass of the damping element 3 and by the corresponding shape of the cavity. In other words, the degrees of freedom for the adjustment of the damping characteristics are rather limited.

FIG. 2 shows a corresponding schematic cut through a damping mechanism in which in the cavity 2 there is not only the damping element 3 but also a damping medium 4. In this case the damping medium 4 is not completely filling the cavity 2 leaving an unfilled portion of space 5. This space 5 is beneficial for taking into account thermal expansion of the damping medium 4. By means of the viscosity of this damping medium the damping characteristics of the damping arrangement can furthermore be adjusted. In operation the ball 3 and the damping medium 4 are kept at the top of the cavity 2 by centrifugal force 10.

According to the present invention, this damping medium 4 is selected to be a metal which is liquid at least at operation temperatures where damping by the damping arrangement is desired. Therefore the damping medium is selected to be a comparatively low melting metal or low melting metal alloy. Possible basic metal materials which can be used to this end are the ones discussed above.

Yet another degree of freedom for adjustment of the damping properties of the damping mechanism is possible by using a metal which is liquid at least during normal operation temperatures as a matrix material for the damping medium, and in this matrix material, particles are dispersed. In other words a liquid metal dispersion can be used.

The particles are selected so as to be and remain solid over the full temperature range operation. Therefore, the particles are typically based on high melting materials of inorganic nature, for example ceramics, glass, or metal (high-temperature melting metal), metal alloys (high-temperature melting metal alloys), metal oxides and the like.

Typical sizes of these particles are as outlined above. The damping characteristics of the damping mechanism can then be adjusted by adjustment of the following parameters of this metal dispersion:
concentration of the particles;
size or size distribution of the particles;
shape of the particles;
surface properties of the particles;
mass of the particles;
mixtures of different particles.

Correspondingly, the damping characteristics of the damping arrangement due to these additional degrees of freedom for adjustment of the viscosity and thus of the damping constant of the system can be adjusted using the above-mentioned degrees of freedom of the dispersion in a wide range and essentially continuously. As a result, for example, using one specific liquid metal matrix material (single metal or metal alloy) and one specific shape of the cavity and one specific damping element, the damping characteristics can be adjusted by addition of the desired amount/type of particles in the dispersion.

FIG. 3 shows a schematic view of a blade with a vibration damper system in accordance with the present invention. The blade comprises a root 6, an airfoil 7 and a tip shroud 8. The root 6 is engageable into a matching profile (not shown) of a rotor 9 such that the blade 1 is fixed on a turbine rotor 9 under centrifugal load during operation. The location of the damping system is another parameter to optimize the system. In this example the vibration damper system comprising the cavity 2, the damping ball 3 and the damping medium 4 is arranged approximately in the lengthwise center of the airfoil 7. Central placement of the system can for example be advantageous for long blades which are supported and damped in the rotor by the root and have shrouds or a shroud ring at the tip. For shroudless blades the damping system is typically arranged close to the blade tip, for example, in the lengthwise tip 20% of airfoil 7.

It is understood, therefore, that this invention is not limited to the particular embodiments disclosed, but is intended to cover all modifications which are within the spirit and scope of the invention as defined by the appended claims; the above description; and/or shown in the attached drawings.

| List of Reference Signs | |
| --- | --- |
| 1 | rotating part, rotating blade |
| 2 | cavity in 1 |
| 3 | damping body, ball |
| 4 | damping medium in 2 |
| 5 | unfilled portion of 2 |
| 6. | root |
| 7. | airfoil |
| 8 | shroud |
| 9. | rotor |
| 10. | centrifugal force |

What is claimed is:

1. A rotating element for a turbine machine comprising an airfoil having a tip shroud, the rotating element comprising:
a vibration damper for damping vibrations of the element during operation of the machine, wherein the vibration damper comprises a closed cavity in a body of the element, wherein in said closed cavity a movable solid damping body as well as a damping medium are located, wherein the closed cavity, the movable solid damping body, and the damping medium are arranged in a lengthwise center of the airfoil, and wherein said damping medium comprises a metal which at rest is in a cool state being a solid, and during start-up, the metal liquefies and is in a liquid state at an operation temperature where damping is desired, and
the damping medium is a dispersion of solid particles in the metal which is in the liquid state at the operation temperature where damping is desired, wherein the solid particles have a melting point above 800° C.

2. The rotating element according to claim 1, wherein the metal of the damping medium has a melting point in the range of 150-800° C.

3. The rotating element according to claim 1, wherein the metal of the damping medium has a melting point in the range of 200-500° C.

4. The rotating element according to claim 1, wherein the metal of the damping medium has a boiling point above 800° C.

5. The rotating element according to claim 1, wherein the metal of the damping medium has a boiling point above 1000° C.

6. The rotating element according to claim 1, wherein the metal of the damping medium has a boiling point above 2000° C.

7. The rotating element according to claim 1, wherein the metal of the damping medium is based on at least one metal selected from the group of: aluminum, magnesium, zinc, tin, lead, copper, silver, manganese or alloys thereof or alloys of one or several members of this group as principal constituents in an amount of more than 50 weight percent with another metal.

8. The rotating element according to claim 1, wherein the damping medium is a dispersion of solid particles in a metal which is in liquid at the operation temperature where damping is desired, wherein the solid particles have a melting point above 1000° C.

9. The rotating element according to claim 1, wherein the damping medium is a dispersion of solid particles in a metal which is in liquid at the operation temperature where damping is desired, wherein the solid particles have a melting point above 2000° C.

10. The rotating element according to claim 1, wherein the solid particles are inorganic particles, based on elementary metal or metal alloy or based on metal oxides.

11. The rotating element according to claim 8, wherein the solid particles are inorganic particles, based on elementary metal or metal alloy or based on metal oxides.

12. The rotating element according to claim 9, wherein the solid particles are inorganic particles, based on elementary metal or metal alloy or based on metal oxides.

13. The rotating element according to claim 1, wherein the particles have an average size of less than 1 mm.

14. The rotating element according to claim 1, wherein the particles have an average size of less than 500 μm.

15. The rotating element according to claim 1, wherein the particles have an average size of less than 200 μm.

16. The rotating element according to claim 1, wherein the particles have an average size of less than 100 μm.

17. The rotating element according to claim 1, wherein adjustment of the viscosity of the damping medium by adjustment of the concentration and/or the particle size of the particles is used for adjusting the damping characteristics of the vibration damper.

18. The rotating element according to claim 1, wherein the movable solid damping body is a ball, and wherein the shape of the cavity is chosen such that damping takes place at least partly by impact damping on the walls of the cavity.

19. The rotating element according to claim 1, wherein the rotating element is a rotating blade of compressor or a turbine.

20. A turbo machine comprising:
at least one rotating element according to claim 1, wherein the rotating element is a rotating blade of a compressor and/or a turbine thereof and wherein all rotating blades of a row of blades are equipped with the vibration damper.

21. A method for damping vibrations of a rotating element of a rotating machine during operation of the machine, wherein the rotating element comprises an airfoil having a tip shroud, the method comprising:
locating in a closed cavity in the body of the rotating element, wherein in said closed cavity a movable solid damping body and a liquid metal as a damping medium, wherein said liquid metal at rest is in a cool state being a solid, and liquefying said metal during start-up, wherein said metal is in a liquid state at an operation temperature where damping is desired; and
arranging the closed cavity, the movable solid damping body, and the damping medium in a lengthwise center of the airfoil, and
the damping medium is a dispersion of solid particles in the liquid metal which is in the liquid state at the operation temperature where damping is desired, wherein the solid particles have a melting point above 800° C.

22. The method according to claim 21, wherein the liquid metal is a dispersion of solid particles in a metal which is in liquid state at the operation temperature where damping is desired, wherein the solid particles have a melting point above 1000° C.

23. The method according to claim 21, wherein the liquid metal is a dispersion of solid particles in a metal which is in liquid state at the operation temperature where damping is desired, wherein the solid particles have a melting point above 2000° C.

24. A rotating element for a turbine machine, comprising:
a root;
an airfoil;
a tip shroud; and
a vibration damper for damping vibrations of the element during operation of the machine, wherein the vibration damper comprises a closed cavity in a body of the element, said closed cavity including a movable solid damping body and a damping medium, and wherein the closed cavity, the movable solid damping body, and the damping medium are arranged in a lengthwise center of the airfoil, and said damping medium comprising a metal which at rest is in a cool state being a solid, and during start-up, the metal liquefies and is in a liquid state at an operation temperature where damping is desired, and
the damping medium is a dispersion of solid particles in the metal which is in the liquid state at the operation temperature where damping is desired, wherein the solid particles have a melting point above 800° C.

* * * * *